UNITED STATES PATENT OFFICE 2,117,569

DYESTUFFS OF THE ANTHRAQUINONE SERIES AND A PROCESS FOR THEIR MANUFACTURE

Albin Peter, Basel, Switzerland, assignor to the firm Chemical Works formerly Sandoz, Basel, Switzerland No Drawing. Application June 8, 1937, Serial No. 147,145. In Switzerland June 18, 1936

10 Claims. (Cl. 260—60)

The present invention relates to new anthraquinone dyestuffs and to a process for their manufacture.

It has been found that new anthraquinone dyestuffs possessing excellent fastness to light and giving brilliant shades on animal fibres can be prepared, if anthraquinone compounds of the general formula

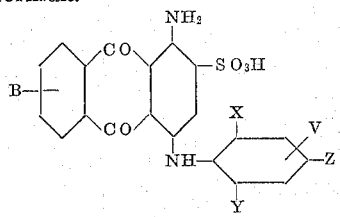

wherein B represents hydrogen or a sulphonic acid group, X represents an alkyl group, Y represents a halogen or an alkyl group, Z represents hydrogen and alkyl and V stands for hydrogen or a sulphonic acid group, are heated with di- or trivalent alcohols or their ethers containing at least one free aliphatic hydroxy group in presence of strong basic compounds and if the products thus obtained are eventually subjected to a treatment with sulphuric acid in order to sulphonate them or to transform them into sulphuric acid esters. On heating the above cited compounds with the polyvalent alcohols, the sulphonic acid group in 2-position will be replaced by a hydroxyalkyl or an esterified hydroxyalkyl group. On treatment with sulphuric acid, dyestuffs will be obtained which contain a sulphonic acid group in the aryl radical or in the case that there is a free hydroxy group in the hydroxyalkyl radical, they will be esterified in this group.

As alcohols which can be used for the manufacture of the new dyestuffs, ethylene glycol, the polyglycols, glycerol and the like and also their ethers containing at least one free aliphatic hydroxy group, such as ethyleneglycolmono-methyl- or -ethyl- or -butylether, polyethyleneglycol-monomethyl- or -ethyl- or -butylether, α-xylenyl-glycerineether etc., can be cited.

As strong alkaline compounds there may be employed the alcoholates, hydroxides and carbonates of alkali metals.

The replacement of the sulphonic acid group in 2-position can be performed by heating the sulphonated anthraquinone compounds at a temperature of 90–150° C., preferably under stirring and in presence of an alkaline compound in sufficient quantity to neutralize the sulphurous acid split off during the reaction. In order to facilitate the reaction and to obtain pure products it is often advantageous to carry out the reaction under addition of an organic solvent, such as nitrobenzene, nitronaphthalene, pyridine, quinoline or of mixtures thereof. The condensation products thus obtained can be isolated from the reaction mixture in the usual manner by diluting with water or with ethanol, whereby the base becomes precipitated.

If the base thus obtained is insoluble in water, it is subjected after drying to a treatment with sulphuric acid. In cases where the base contains a free hydroxy group in the alcoholic radical, it is esterified by simple dissolving in concentrated sulphuric acid, or in monohydrate, at a temperature of 0–30° C. If it is intended to introduce a sulphonic acid group into the aryl radical, the base is treated with weak monohydate at a temperature of 30–60° C.

If the starting compounds contain besides the sulphonic acid group in 2-position another sulphonic acid group in the molecule, the reaction products obtained by the present process will be soluble in water without treatment with sulphuric acid, but in order to increase their solubility they can naturally be subjected to sulphonation or to esterification with sulphuric acid. The sulphonated compounds thus obtained are isolated from the reaction mixture in the usual manner, for example by mixing them with water or ice-salt water, whereby they become precipitated and can be filtered off.

One object of the present invention is the process for manufacturing new dyestuffs of the anthraquinone series, consisting in heating anthraquinone compounds of the general formula

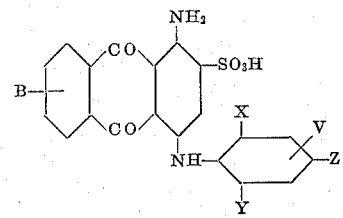

wherein B stands for hydrogen or a sulphonic acid group, X stands for alkyl, Y stands for halogen or alkyl, Z stands for hydrogen or alkyl and V stands for hydrogen or a sulphonic acid group, with di- or trivalent alcohols or their ethers, containing at least one free aliphatic hydroxy group, in presence of strong alkaline compounds and eventually subjecting the compounds thus obtained to a treatment with sulphuric acid.

Another object of the present invention is the water-soluble anthraquinone dyestuffs of the general formula:

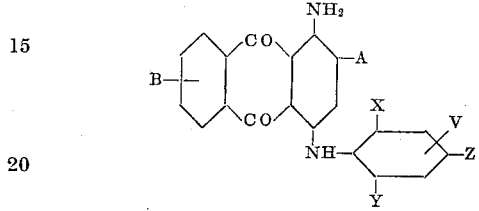

wherein A represents an oxalkyl or a sulphonated oxalkyl group, B stands for hydrogen or a sulphonic acid group, X stands for alkyl, Y stands for halogen or alkyl, Z stands for hydrogen and alkyl and V stands for hydrogen and a sulphonic acid group, which dyestuffs dye animal fibres in brilliant red to violet shades of good fastness to light.

The following examples, without being limitative, illustrate the present invention, the parts being by weight:—

*Example 1*

20 parts of the dyestuff of the formula

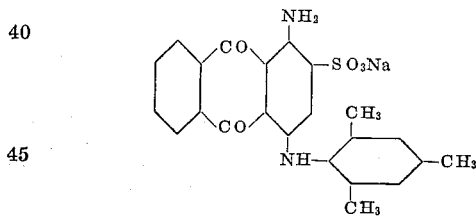

are introduced into a hot solution of 10 parts of potassium hydroxide in 100 parts of ethylene glycol and heated under stirring during 2 hours at 100–110° C. When a test taken therefrom shows that the product became completely insoluble in water, the reaction mixture is diluted at 80° C. with 100 parts of ethanol or of water, allowed to cool down and the precipitated base is filtered, washed and dried. The base thus obtained is then dissolved in five times its weight of concentrated sulphuric acid at 15° C. After short stirring, a test shows that the base became water-soluble. The reaction mass is then poured on an ice-salt water mixture, the dyestuff filtered, diluted with water, neutralized and salted out by means of sodium chloride. The dyestuff isolated in this manner possesses the formula

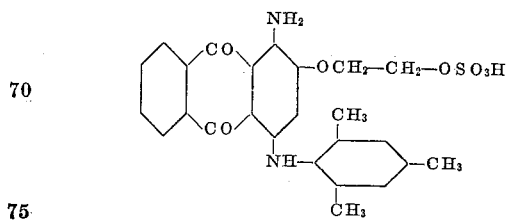

and dyes wool and natural silk in a brilliant pure violet possessing very good fastness to light.

If instead of glycol one uses glycerol, a similar dyestuff of the formula

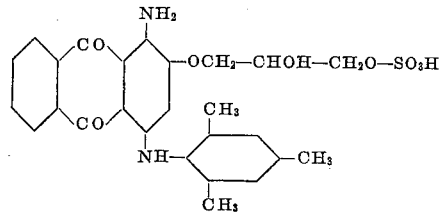

will be obtained.

The potassium hydroxide used for the condensation can also be replaced by potassium carbonate or sodium carbonate.

*Example 2*

10 parts of sodium hydroxide or potassium hydroxide are dissolved in 100 parts of glycerol and 10 parts of the dyestuff of the formula

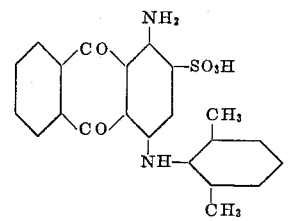

are added thereto. After stirring for one hour at 120° C. the reaction mixture is allowed to cool down, diluted with alcohol and the precipitated base filtered. The condensation product thus obtained is isolated as described in Example 1 and esterified with sulphuric acid. This dyestuff possesses the formula

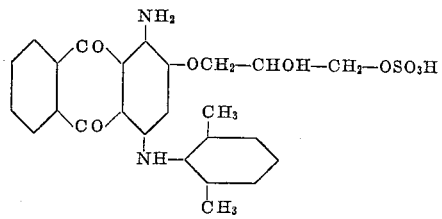

and dyes wool and silk in a brilliant red violet shade.

*Example 3*

20 parts of potassium hydroxide are dissolved in 500 parts of warm ethylene-glycolmonoethylether and into the solution thus obtained are introduced 50 parts of the dyestuff used in Example 1. The reaction mass is then stirred at 100–105° C. until a test taken therefrom became no more redder in alcohol. The reaction mass is then diluted with ethanol, cooled down and the base which crystallizes out, is isolated in the usual manner.

10 parts of this base are dissolved in 50 parts of sulphuric acid monohydrate and treated below 30° C. with 15 parts of weak oleum. After stirring for a short time at 30° C., a test shows that the base becomes water-soluble. The dyestuff is precipitated by pouring the sulphonation mixture on ice-salt water mixture, filtered and neutralized.

The dyestuff thus obtained possesses the formula

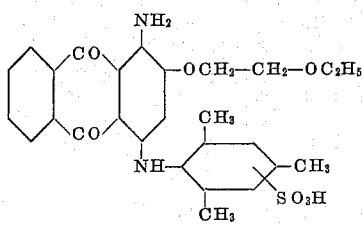

and dyes wool in brilliant red-violet shades of good fastness to light, to washing and to perspiration.

Similar deystuffs are obtained, if the compound of the formula

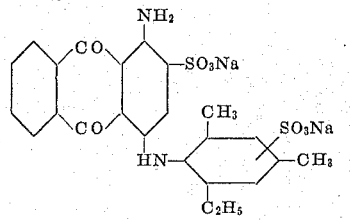

is condensed with the above cited glycol ether or with a diethyleneglycolmonoalkyl ether or with an arylglycerineether.

Example 4

Into a solution of 10 parts of potassium hydroxide in 100 parts of glycol are introduced 10 parts of the dyestuff obtained by condensing a mixture consisting of 1-amino-4-bromo-anthraquinone-2,5- and 2,8-disulphonic acids with 1-amino-2,4,6-trimethylbenzene and stirred during one hour at 120° C. After cooling down, the reaction mass is diluted with water and the precipitated dyestuff filtered off. It dyes wool in a bluish violet shade, which on esterification with sulphuric acid, gives a redder and more easily soluble dyestuff.

Example 5

10 parts of potassium hydroxide are dissolved in 100 parts of warm glycerine. To this solution are added 10 parts of the potassium salt of 1-amino-4-(2',4'-dimethyl-6'-bromo)phenylaminoanthraquinone-2-sulphonic acid, 10 parts of pyridine and 2 parts of ntrobenzene and the reaction mixture is stirred at 110° C., until a test is no more soluble with a blue coloration in water. The reaction mass is then diluted with hot water, the precipitated base filtered off, washed and dried. The dry base is then esterified with sulphuric acid monohydrate and the dyestuff isolated as described in Example 1. It possesses the formula

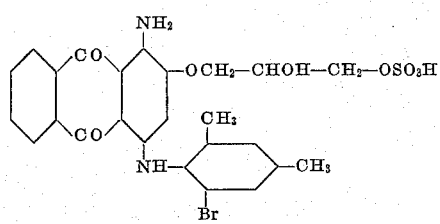

and dyes wool in a reddish, brilliant violet shade of good fastness to light.

I claim:
1. A process for the manufacture of water-soluble anthraquinone dyestuffs, comprising heating anthraquinone compounds of the general formula

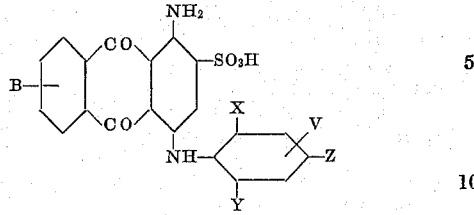

wherein B represents one of the group consisting of hydrogen and a sulphonic acid group, X represents one of the group consisting of methyl and ethyl, Y represents one of the group consisting of halogen, methyl and ethyl, Z represents one of the group consisting of hydrogen, methyl and ethyl and V represents one of the group consisting of hydrogen and a sulphonic acid group, with an alcohol selected from the class consisting of di- and trivalent aliphatic alcohols and their ethers containing at least one free aliphatic hydroxy group, in presence of a basic compound selected from the class consisting of alcoholates, hydroxides and carbonates of alkali metals at a temperature of 90–150° C.

2. A process for the manufacture of water-soluble anthraquinone dyestuffs, comprising heating anthraquinone compounds of the general formula

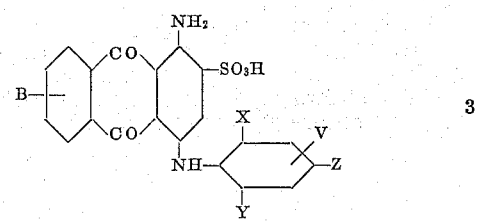

wherein B represents one of the group consisting of hydrogen and a sulphonic acid group, X represents one of the group consisting of methyl and ethyl, Y represents one of the group consisting of halogen, methyl and ethyl, Z represents one of the group consisting of hydrogen, methyl and ethyl and V represents one of the group consisting of hydrogen and a sulphonic acid group, with an alcohol selected from the class consisting of di- and trivalent aliphatic alcohols and their ethers containing at least one free aliphatic hydroxy group, in presence of a basic compound selected from the class consisting of alcoholates, hydroxides and carbonates of alkali metals at a temperature of 90–150° C. and of an organic solvent selected from the group consisting of mononitrobenzene, mononitronaphthalene, pyridine and quinoline.

3. A process for the manufacture of water-soluble anthraquinone dyestuffs, comprising heating an anthraquinone compound of the general formula

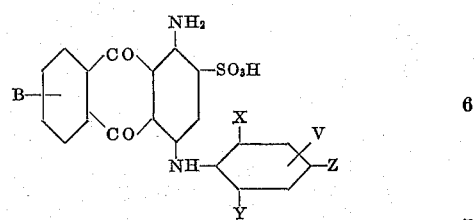

wherein B represents one of the group consisting of hydrogen and a sulphonic acid group, X represents one of the group consisting of methyl and ethyl, Y represents one of the group consisting of halogen, methyl and ethyl, Z represents one of the group consisting of hydrogen, methyl and ethyl and V represents one of the group consisting of hydrogen and a sulphonic acid group, with an alcohol selected from the class consisting of di- and trivalent aliphatic alcohols and their ethers containing at least one free aliphatic hydroxy group, in presence of a basic compound selected from the class consisting of alcoholates, hydroxides and carbonates of alkali metals at a temperature of 90–150° C. and of an organic solvent selected from the group consisting of mononitrobenzene, mononitronaphthalene and quinoline, and subjecting the condensation product thus obtained to a treatment with concentrated sulphuric acid at a temperature of 0–30° C.

4. A process for the manufacture of a water-soluble anthraquinone dyestuff, comprising heating the anthraquinone compound of the formula

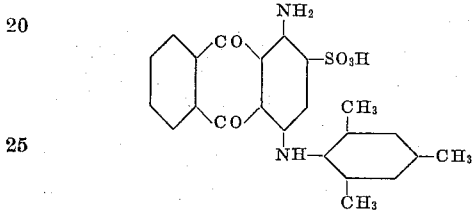

with ethyleneglycol in presence of potassium hydroxide at 100–110° C. and subjecting the condensation product thus obtained to a treatment with concentrated sulphuric acid at 15° C. in order to transform it into the sulphuric acid ester.

5. A process for the manufacture of a water-soluble anthraquinone dyestuff, comprising heating the anthraquinone compound of the formula

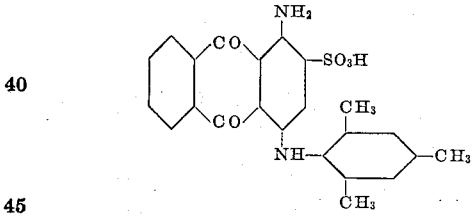

with glycerol in presence of potassium hydroxide at 100–110° C. and subjecting the condensation product thus obtained to a treatment with concentrated sulphuric acid at 15° C. in order to transform it into the sulphuric acid ester.

6. A process for the manufacture of a water-soluble anthraquinone dyestuff, comprising heating the anthraquinone compound of the formula

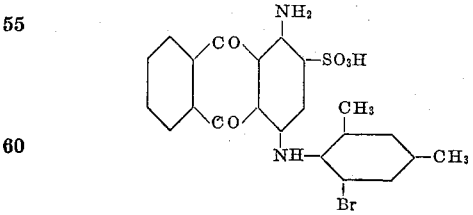

with glycerol in presence of potassium hydroxide and of pyridine and nitrobenzene at 110° C. and subjecting the condensation product thus obtained to a treatment with concentrated sulphuric acid at 15° C. in order to transform it into the sulphuric acid ester.

7. The water-soluble anthraquinone dyestuffs of the general formula

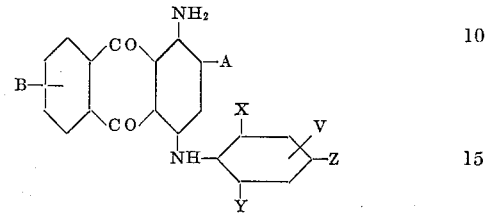

wherein A represents one of the group consisting of an hydroxyalkyl and a sulphonated hydroxyalkyl group, B represents one of the group consisting of hydrogen and a sulphonic acid group, X represents one of the group consisting of methyl and ethyl, Y represents one of the group consisting of halogen, methyl and ethyl, Z represents one of the group consisting of hydrogen, methyl and ethyl and V represents one of the group consisting of hydrogen and a sulphonic acid group, which dyestuffs dye animal fibres in brilliant red to violet shades of good fastness to light.

8. The anthraquinone dyestuff of the formula

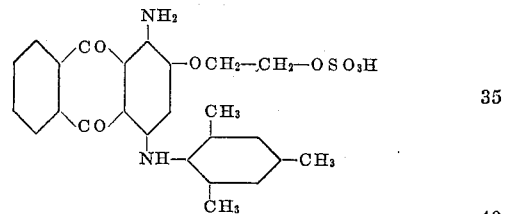

9. The anthraquinone dyestuff of the formula

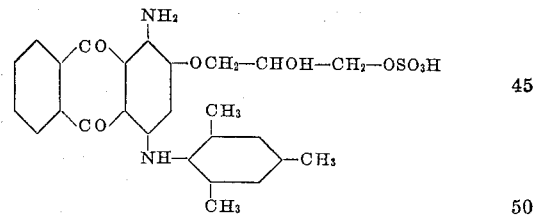

10. The anthraquinone dyestuff of the formula

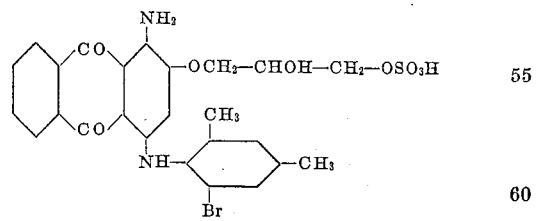

ALBIN PETER.